(12) United States Patent
Greiner et al.

(10) Patent No.: US 8,062,726 B2
(45) Date of Patent: Nov. 22, 2011

(54) HEAT-CONDUCTING THERMOPLASTIC COMPOUNDS AND USES THEREOF

(75) Inventors: Robert Greiner, Baiersdorf (DE); Manfred Ochsenkühn, Berg (DE); Lothar Schön, Neunkirchen (DE)

(73) Assignee: Siemens Aktiengesellschaft, Munich (DE)

( * ) Notice: Subject to any disclaimer, the term of this patent is extended or adjusted under 35 U.S.C. 154(b) by 641 days.

(21) Appl. No.: 10/499,043

(22) PCT Filed: Dec. 12, 2002

(86) PCT No.: PCT/DE02/04560
§ 371 (c)(1),
(2), (4) Date: Sep. 17, 2004

(87) PCT Pub. No.: WO03/051971
PCT Pub. Date: Jun. 26, 2003

(65) Prior Publication Data
US 2005/0049345 A1    Mar. 3, 2005

(30) Foreign Application Priority Data
Dec. 17, 2001 (DE) .................. 101 61 882

(51) Int. Cl.
*B29D 23/00* (2006.01)
*C08K 3/00* (2006.01)

(52) U.S. Cl. ....... 428/36.9; 523/220; 524/403; 524/413; 524/437; 524/440; 524/441

(58) Field of Classification Search .................. 524/404, 524/403, 413, 437, 440, 441; 428/36.9; 523/220
See application file for complete search history.

(56) References Cited

U.S. PATENT DOCUMENTS

| 5,331,037 | A  | * | 7/1994 | Koslow ................... 524/496 |
| 5,545,473 | A  | * | 8/1996 | Ameen et al. .................. 428/212 |
| 6,143,819 | A  |   | 11/2000 | Nakanishi |
| 6,306,957 | B1 | * | 10/2001 | Nakano et al. .................. 524/700 |
| 7,154,270 | B2 | * | 12/2006 | Arz et al. ....................... 324/318 |

FOREIGN PATENT DOCUMENTS

| EP | 0 882 574 | 12/1998 |
| JP | 02071094 A | * 3/1990 |

OTHER PUBLICATIONS

Machine Translation of JP 2001-339019, Dec. 7, 2001.*
Database WPI, Section Ch, Week 200261, Derwent Publications Ltd., London, GB; AN 2002-568557 XP002243619 & JP 2001 339019 A (Kitagawa Kogyo KK), Dec. 7, 2001.

* cited by examiner

*Primary Examiner* — Vickey Nerangis
(74) *Attorney, Agent, or Firm* — Young & Thompson

(57) ABSTRACT

The invention relates to flexible compounds that are made of a thermoplastic elastomer and a filler having increased thermal conductivity, and to flexible heat-conducting tubes produced on the basis thereof that are especially useful as heating or cooling tubes. The inventive mixtures have a thermal conductivity in the range of from 0.5 to 2 W/mK.

13 Claims, No Drawings

HEAT-CONDUCTING THERMOPLASTIC COMPOUNDS AND USES THEREOF

The invention relates to flexible compounds comprising thermoplastic elastomers and to flexible heat-conducting tubes produced on the basis thereof that are especially useful as heating or cooling tubes.

Electric and electronic devices are simultaneously becoming increasingly more compact in design and more efficient. As a result the ohmic losses also increase, leading to a rise in the operating temperature. This is generally intolerable since with increasing temperatures the service life of the devices considerably reduces and the error rate increases exponentially, particularly with semiconductors. Furthermore the plastics used for insulation can only be used within a restricted temperature range, for example mechanical stability reduces at high temperatures and ageing processes above the temperature resistance lead to a deterioration in both the mechanical and dielectric characteristics.

One very effective method for transferring and dissipating heat especially from larger devices, such as electrical windings, comprises fitting effective heat-conducting metal piping (e.g. made from copper) and pumping through coolant liquids such as cold water. In order to avoid spark-overs it may be necessary to provide the metal piping with an insulation layer made from plastic, which in turn represents an undesirable heat resistance. Other disadvantages include the cost involved in connecting a plurality of pipes fed in parallel with each other at the ends and that the design-dependent curvatures are not feasible without cross-sectional alterations which obstruct the flow and also require an increase in the inlet pressure.

The use of flexible commercial plastics enables more rational manufacture (winding around the parts to be cooled, pre-manufacture of coiled heat exchangers). Disadvantageous here however is that the plastic and thus the tube wall only demonstrate a very low heat conductivity of approximately 0.15-0.20 W/mK, thereby significantly reducing the effectiveness of the cooling process. This is further reinforced when, due to the required pressure resistance, tubes with a relatively large wall thickness of for example 1-2 mm must be used. If narrow bending radiuses are required due to the design, a thick-walled tube must be used for this reason, since, as is well known, the tendency to kink increases with smaller wall thicknesses. To improve the heat transfer between the thermal conductor and the cooling tube, the device/winding can be encapsulated with a cast resin, preferably with a higher level of heat conductivity.

The object of the invention is therefore to make available thermoplastically processible compounds, which, despite having a high fill level, combine a narrow bending radius with a high bursting pressure and a high level of fracture elongation when processed as a tube.

The invention relates to flexible thermoplastically processible compounds demonstrating a heat conductivity greater than 0.5 W/mK, comprising a thermoplastically processible molding material and a filler.

According to one embodiment the compound demonstrates a tensile strength greater than 15 MPa and/or a modulus of elasticity between 100 and 1000 MPa.

According to one embodiment the compound has a filler content of between 15 and 50% by volume, preferably a content of 20 to 40% by volume.

The compound comprises a thermoplastically processible molding material and a heat-conducting filler.

As a rule, all thermoplastically processible molding materials, which have a high fracture elongation (greater than 200%) and a low modulus of elasticity (100 to 500 MPa), can be used. The fracture elongation is considerably reduced by the high proportion of filler and the modulus of elasticity is increased, thus resulting in a more rigid final product in comparison with the initial product. The tensile strength and bending resistance must be sufficiently high in order to meet the requirements of the necessary bending radiuses and pressure tests whilst in a filled state. The tensile strength of the primary product should amount to >20 Mpa.

The group of thermoplastic elastomers (plastics which possess the characteristics of elastomers and can be processed in the same way as thermoplastics) as well as copolymers are particularly suitable for this purpose.

According to one embodiment the molding material is a thermoplastic elastomer from the following group: TPE-U (thermoplastic elastomer on a polyurethane base), TPE-A (thermoplastic elastomer on a polyamide base), TPE-E (thermoplastic elastomer on a polyester base), TPE-O (thermoplastic elastomers on a polyolefine base), styrene block copolymers (SEBS block polymer, SBS block polymer), EPDM/PE mixtures, EPDM/PP mixtures, EVA, PEBA (polyether block amide)

According to one embodiment the filler is selected from the following group of fillers; quartz, aluminium oxide, magnesium oxide, aluminium nitride, silicon carbide, silicon nitride, boron nitride, zinc sulfide and mixtures thereof. It is also possible to replace the aforementioned fillers partially or in full with good heat conducting pulverized metals such as aluminium, copper or silver.

Quartz, aluminium oxide and boron nitride are preferred.

In principle, splintered, spherical, filamentary as well as plate-like particles can be used.

The particle size depends on the respective purpose. When using the mixtures according to the invention as tube materials it is advantageous to remain with a maximum particle size which is clearly below the wall thickness to be implemented, preferably the maximum particle size should amount to less than half the wall thickness. The average particle size is less than 200 µm, preferably less than 100 µm, particularly preferably less than 50 µm. Furthermore it is advantageous to use a bimodal or trimodal particle size distribution.

As a rule, the use of additives, softeners, bonding agents, color pigments and processing agents for the targeted modification of processing and final characteristics is possible and permitted. Nevertheless as a result of migration problems, additives, in particular softeners, should only be very selectively deployed.

As a rule, the compounds are continuously manufactured on a dual screw extruder. The processing parameters must thereby be adjusted to the respective plastic and filler and the screw geometry must be adapted.

In principle, manufacture can also be effected discontinuously in a kneader or on a calendar (e.g. shear roller calendar).

As a result of the high fill level and the possible abrasion, it must be ensured that the compounding machine and the subsequent devices are appropriately equipped (for example, steel plated cylinders, screws, tools and granulating blades.

The final compound must have a sufficiently fine filler distribution and homogeneity for subsequent processing.

The tube is manufactured using a conventional tube extrusion line. The compound, depending on its material, is melted in a single or dual screw extruder and homogenized. It its melted state, the compound is initially shaped continuously via the tool insert to form a tube and discharged. Finally it is calibrated, hardened, cooled and wound.

Due to the high fill level and abrasion, it must be ensured that the discharge extruder and subsequent devices are appropriately equipped (for example, steel plated cylinders, screws and tool inserts).

Typically the internal diameter of the tubes is between 1 mm and 20 mm with a wall thickness of 0.05-5 mm, preferably a wall thickness of 0.2-2 mm.

The cross-section of the tube can be round or oval and can comprise a plurality of chambers separated by means of studs.

The tube according to the invention can be used both as a cooling tube and as a heating tube as a result of the high heat conductivity of the tube wall. The tube is particularly suitable for the cooling of electrical devices such as motors or transformers. Applications such as floor heating and/or other heat exchangers of all types may also be considered.

The three examples below describe the invention in more detail:

In the following examples, the manufacture of compounds and tubes is carried out using a dual screw extruder.

A thermoplastic elastomer with a polymide base (TPE-A) is used as the thermoplastic material.

The compositions and characteristics are assembled in the table below.

|  |  | Example | | |
|---|---|---|---|---|
|  |  | 1 | 2 | 3 |
| Plastic |  | TPE-A | TPE-A | TPE-A |
| Filler |  | None | Aluminium oxide | Boron nitride |
| Average particle size | μm | N/A | 33.6 | 8.0 |
| Filler | % by weight | 0 | 72.3 | 35.3 |
| Molding material characteristics | | | | |
| Modulus of elasticity | MPa | 146 | 310 | 280 |
| Fracture elongation | % | 380 | 29 | 78 |
| Heat conductivity | W/mK at 40° C. | 0.2 | 1.1 | 0.7 |
| Tube characteristics (internal diameter 4 mm/wall thickness 1 mm) | | | | |
| Minimum bending radius |  | <5 cm | <5 cm | <5 cm |
| Bursting pressure |  | >20 bar | >20 bar | >20 bar |

Example 1 is a comparative example without additional filler. In comparison with example 1, examples 2 and 3 demonstrate substantially increased heat conductivity. Despite a high filler content in examples 2 and 3, the fracture elongation is sufficiently high to allow a bending radius of <5 cm.

Compared with commercial thermoplastic material and tubes, a high heat conductivity of 0.5-2 W/mK is achieved using the compounds according to the invention, which is thus 3-10 times greater than with the initial plastic. At the same time, the tubes are characterized by high flexibility and strength. The fracture elongation of >20% enables the processing of the manufactured tubes with a bending radius of <5 cm. Despite high flexibility, the manufactured tubes demonstrate a bursting pressure of >20 bar.

It is surprising that the compositions according to the invention demonstrate a fracture elongation of >20%, despite a very high filler content, and that tubes can therefore be manufactured with a bending radius <5 cm without fracture or kinking. It is also surprising that the tubes according to the invention have a bursting pressure of >20 bar.

The invention claimed is:

1. A flexible tube comprising a thermoplastically processible composition with a heat conductivity greater than 0.5 W/mK, comprising:
   a thermoplastically processible molding material selected from the group consisting of TPE-U (thermoplastic elastomer on a polyurethane base), TPE-A (thermoplastic elastomer on a polyamide base), TPE-E (thermoplastic elastomer on a polyester base), TPE-O (thermoplastic elastomer on a polyolefin base), styrene block copolymers, EPDM/PE-mixtures, EPDM/PP mixtures, and PEBA (polyether block amide); and
   inorganic filler particles, wherein
   said inorganic filler particles comprise heat-conducting pulverized metals selected form the group consisting of aluminium, copper, and silver,
   said inorganic filler particles have a trimodal particle size distribution, and
   said composition is a flexible thermoplastically processible composition in that said tube has a bending radius less than 5 cm without fracture or kinking, a fracture elongation greater than 20% and a bursting pressure of greater than 20 bar.

2. The tube according to claim 1, with at least one of a tensile strength of greater than 15 MPa and a modulus of elasticity of between 100 and 1000 MPa.

3. The tube according to claim 1, wherein the filler further comprises a material selected from the group consisting of quartz, aluminium oxide, magnesium oxide, aluminium nitride, silicon carbide, silicon nitride, boron nitride, zinc sulfide and mixtures thereof.

4. The tube according to claim 1, wherein the filler comprises heat-conducting pulverized metals selected from the group consisting of aluminium and silver.

5. The tube according to claim 1, with a filler content of between 15 and 50% by volume.

6. The tube according to claim 1, wherein the average particle size of the filler used is less than 200 μm.

7. The tube according to claim 1, wherein the particles in the filler have a maximum particle size smaller than the wall thickness of the tube.

8. The tube of claim 1 wherein the tube has an internal diameter in the range of 1 to 20 mm with a wall thickness ranging from 0.05 to 5 mm.

9. The tube according to claim 1, with a fracture elongation greater than 20%.

10. The tube according to claim 1, wherein the average particle size of the filler used is less than 100 μm.

11. The tube according to claim 1, wherein the average particle size of the filler used is less than 50 μm.

12. A tube comprising a composition comprising:
   a thermoplastically processible molding material selected from the group consisting of TPE-U (thermoplastic elastomer on a polyurethane base), TPE-A (thermoplastic elastomer on a polyamide base), TPE-E (thermoplastic elastomer on a polyester base), TPE-O (thermoplastic elastomer on a polyolefin base), styrene block copolymers, EPDM/PE-mixtures, EPDM/PP mixtures, and PEBA (polyether block amide);
   inorganic filler particles having a trimodal particle size distribution and comprising heat-conducting pulverized metals selected form the group consisting of aluminium, copper, and silver;
   a heat conductivity greater than 0.5 W/mK;
   a fracture elongation greater than 20%; and at least one of a tensile strength of greater than 15 MPa and a modulus of elasticity of between 100 and 1000 MPa.

13. A heat conducting tube comprising:
- a heat conductivity greater than 0.5 W/mK;
- a fracture elongation greater than 20%;
- a bending radius less than 5 cm without fracture or kinking;
- a bursting pressure of greater than 20 bar;
- an internal diameter in the range of 1 to 20 mm;
- a wall formed from a thermoplastically processible composition, said wall having thickness ranging from 0.05 to 5 mm, wherein
- said thermoplastically processible composition comprises a thermoplastically processible molding material selected from the group consisting of TPE-U (thermoplastic elastomer on a polyurethane base), TPE-A (thermoplastic elastomer on a polyamide base), TPE-E (thermoplastic elastomer on a polyester base), TPE-O (thermoplastic elastomer on a polyolefin base), styrene block copolymers, EPDM/PE-mixtures, EPDM/PP mixtures, and PEBA (polyether block amide) and inorganic filler particles with a trimodal particle size distribution, and
- said inorganic filler particles comprise heat-conducting pulverized metals selected form the group consisting of aluminium, copper, and silver.

* * * * *